United States Patent
Schaefer et al.

(10) Patent No.: US 11,443,529 B2
(45) Date of Patent: Sep. 13, 2022

(54) METHOD AND APPARATUS FOR DETECTING SURROUNDINGS, AND VEHICLE WITH SUCH AN APPARATUS

(71) Applicants: DAIMLER AG, Stuttgart (DE); ROBERT BOSCH GMBH, Stuttgart (DE)

(72) Inventors: Manuel Schaefer, Wolfschlugen (DE); Markus Gressmann, Boeblingen (DE); Helmuth Eggers, Sindelfingen (DE); Philipp Lehner, Muehlacker (DE); Martin Meinke, Hildrizhausen (DE)

(73) Assignees: Daimler AG, Stuttgart (DE); Robert Bosch GmbH, Stuttgart (DE)

( * ) Notice: Subject to any disclaimer, the term of this patent is extended or adjusted under 35 U.S.C. 154(b) by 29 days.

(21) Appl. No.: 17/252,368

(22) PCT Filed: May 9, 2019

(86) PCT No.: PCT/EP2019/061904
§ 371 (c)(1),
(2) Date: Dec. 15, 2020

(87) PCT Pub. No.: WO2019/238319
PCT Pub. Date: Dec. 19, 2019

(65) Prior Publication Data
US 2021/0271908 A1 Sep. 2, 2021

(30) Foreign Application Priority Data
Jun. 15, 2018 (DE) ...................... 10 2018 004 782.3

(51) Int. Cl.
*G06K 9/00* (2022.01)
*G01S 17/86* (2020.01)
(Continued)

(52) U.S. Cl.
CPC ............ *G06V 20/584* (2022.01); *G01S 17/86* (2020.01); *G01S 17/89* (2013.01); *G01S 17/931* (2020.01);
(Continued)

(58) Field of Classification Search
None
See application file for complete search history.

(56) References Cited

U.S. PATENT DOCUMENTS 9,210,398 B2 12/2015 Lee et al.
9,435,887 B2 9/2016 Kim et al.
(Continued)

FOREIGN PATENT DOCUMENTS

| DE | 102017108248 A1 | 10/2017 |
|---|---|---|
| EP | 2389007 A2 | 11/2011 |
| WO | WO 2019/079511 A1 | 4/2019 |

OTHER PUBLICATIONS

European Patent Office, International Search Report with Written Opinion, issued in PCT/EP2019/061904, dated Jul. 10, 2019, 21 pages, European Patent Office, Rijswijk, Netherlands.
(Continued)

*Primary Examiner* — Edemio Navas, Jr.
(74) *Attorney, Agent, or Firm* — Marshall & Melhorn, LLC

(57) ABSTRACT

A method and apparatus for detecting surroundings around a vehicle may include the step of periodically scanning the surroundings in a first detection region by a laser scanner. The method may also include detecting the surroundings in a second detection region by an optical camera. The first detection region and the second detection region may at least overlap each other. An optical sensor in the camera may be exposed at least twice within one period of the laser scanner. A first exposure time for a first exposure of the at least two
(Continued)

exposures of the optical sensor may be chosen and synchronized with the laser scanner so that the first exposure occurs within a first time window, in which the laser scanner scans the first detection region.

13 Claims, 1 Drawing Sheet

(51) Int. Cl.
| | |
|---|---|
| G01S 17/89 | (2020.01) |
| G01S 17/931 | (2020.01) |
| G06K 9/20 | (2006.01) |
| G06K 9/62 | (2022.01) |
| G08G 1/04 | (2006.01) |
| H04N 5/235 | (2006.01) |
| G06V 20/58 | (2022.01) |
| G06V 10/22 | (2022.01) |

(52) U.S. Cl.
CPC .......... *G06K 9/6289* (2013.01); *G06V 10/22* (2022.01); *G08G 1/04* (2013.01); *H04N 5/2353* (2013.01)

(56) References Cited

U.S. PATENT DOCUMENTS

| | | |
|---|---|---|
| 9,530,062 B2 | 12/2016 | Nguyen et al. |
| 10,436,885 B2 | 10/2019 | Wheeler et al. |
| 10,469,753 B2 | 11/2019 | Yang et al. |
| 10,498,966 B2 | 12/2019 | Wheeler et al. |
| 10,531,004 B2 | 1/2020 | Wheeler et al. |
| 10,841,496 B2 | 11/2020 | Wheeler et al. |
| 10,897,575 B2 | 1/2021 | Wheeler et al. |
| 10,999,511 B2 | 5/2021 | Yang et al. |
| 2011/0286661 A1* | 11/2011 | Lee ............ H04N 13/128 382/154 |
| 2016/0116593 A1* | 4/2016 | Kim ............ G01S 17/931 356/5.01 |
| 2016/0180177 A1 | 6/2016 | Nguyen et al. |
| 2017/0041562 A1* | 2/2017 | Solhusvik .......... H04N 5/35581 |
| 2018/0136332 A1 | 5/2018 | Barfield, Jr. et al. |
| 2020/0120253 A1 | 4/2020 | Wheeler et al. |

OTHER PUBLICATIONS

The International Bureau of WIPO, International Preliminary Report on Patentability, issued in PCT/EP2019/061904, dated Dec. 15, 2020, The International Bureau of WIPO, 9 pages, Geneva, Switzerland.

* cited by examiner

METHOD AND APPARATUS FOR DETECTING SURROUNDINGS, AND VEHICLE WITH SUCH AN APPARATUS

BACKGROUND OF THE INVENTION

The invention concerns a method and an apparatus for detecting surroundings, in particular the surroundings around a vehicle, and a vehicle with such an apparatus.

It is known to combine optical cameras with laser scanning processes or laser scanners for detection of surroundings, in particular in vehicles. For example, the US American patent application US 2016/0180177 A1 discloses a system installed in a motor vehicle for detecting the border of a road lane, which has both a camera and a LiDAR detector, wherein a first probabilistic model for the lane border is generated from the camera data, wherein a second probabilistic model for the lane border is generated from the LiDAR data, and wherein the probabilistic models thus generated are merged with each other to get a fused probabilistic model from which the lane border is detected.

The German published patent application DE 10 2017 108 248 A1 discloses a computer-implemented road feature recognition method, wherein an image from a camera system mounted on a vehicle in a street is received and processed. The data thus received can be merged with other sensor data, from LiDAR sensors, for example, to improve detection and classification accuracy and reliability.

Optical cameras generally provide high-resolution images of the detected surroundings, but without distance information. Laser scanners generate 3D point clouds of the scanned surroundings, which makes them able to offer highly precise distance information. However, they have significantly lower resolution.

It is further known to segment images taken by optical cameras semantically, in particular using neural networks, wherein objects in the images are recognized and each pixel is assigned a class label, such as "road," "vehicle," or "pedestrian." In this way the image is separated into semantic segments. It would be advantageous to be able to combine this semantic segmentation information with the 3D point clouds obtained from a laser scanner, so that corresponding class labels could also be assigned to the 3D points in the point cloud. This would clearly improve the scene interpretation in a vehicle as well as the method's predictions concerning other traffic participants. However, this requires precise synchronization of both the laser scanner's scanning of the surroundings and the optical camera's imaging of the surroundings, as well as the selection of the lowest possible exposure time for the optical camera, in order to get suitably sharp images from a moving vehicle.

Such short exposure times are problematic, however, if the camera images are also preferably supposed to be used to recognize light signals such as traffic lights, traffic signs configured as light signals, brake lights, turn signals, and similar light signals. This is especially due to the fact that modern light signals typically use light-emitting diodes, which emit short light pulses in rapid succession and are operated in particular by pulse width modulation. If the exposure times are too short, it gives rise to the danger that the exposure might occur between light pulses from the light signal—i.e., during a dark phase—in which case the status of the light signal, e.g., the switching status of a traffic light, the type of traffic sign displayed, etc., can no longer be recognized in the image.

Reliable semantic segmentation of 3D point clouds with camera imaging backup, on the one hand, and reliable recognition of illuminated signs, on the other, therefore seem to be opposing, mutually incompatible goals.

The objective of the invention is to offer a method and an apparatus for detecting surroundings, in particular around a vehicle with such an apparatus, to which the abovementioned disadvantages do not apply.

This objective is met by the features described in the independent claims. Advantageous embodiments are presented in the dependent claims.

The objective is fulfilled in particular by offering a method for detecting surroundings, specifically the surroundings around a vehicle, wherein the surroundings in a first detection region are detected periodically by a laser scanner and wherein the surroundings in a second detection region are detected by an optical camera. The first detection region and the second detection region at least overlap each other. An optical sensor in the camera is exposed at least twice during one laser scanner period, and a first exposure time for the first exposure of the at least two exposures of the optical sensor is chosen and synchronized with the laser scanner such that the first exposure occurs within a first time window, in which the laser scanner detects the first detection region. This ensures that the image capture from the optical camera is synchronized with the detection of the first detection region that at least overlaps the second detection region, so that both the laser scanner and the optical camera at least partially focus on the same area of the surroundings. The first exposure time within the first time window is chosen to be short enough that sharp images are received by the camera even from a moving vehicle. The camera exposure is synchronized with the laser scanner, and the camera is exposed at least twice during the laser scanner period, wherein one of the exposures occurs simultaneously with the laser scanner's scan of the surroundings, in particular simultaneously with the detection of the common overlapping detection region. Since a second exposure of the optical sensor occurs during the laser scanner period, reliable detection of even light signals operated by pulse width modulation is possible, because a second exposure time for the second exposure within the laser scanner period can be of any length and therefore in particular longer than the first exposure time within the first time window. In this way, within one laser scanner period, it is possible to collect data that allows for semantic segmentation of the optical camera image and of the 3D point cloud detected by the laser scanner, and also optical data permitting reliable recognition of light signals.

A detection region here is understood to mean an angle range from a vertical axis, in particular the vertical axis of a vehicle, consequently an azimuth angle range. The first detection region is a corresponding angle range in which the laser scanner actually detects the surroundings. The first detection region is preferably smaller than one laser scanner scan range that the laser scanner scans within one period. In particular, it is possible for the laser scanner to be configured as a laser scanner rotating around an axis, preferably rotating around a vertical axis, wherein it covers a scan range of 360° within one period. However, it preferably does not detect data in the entire scan range, but rather only in the smaller first detection region.

The second detection region is correspondingly an angle range given by an aperture angle of the optical camera's lens.

The fact that the first detection region and the second detection region at least overlap each other means that they are at least congruent in sections. The detection regions are preferably essentially congruent, and most preferably one completely overlaps the other, wherein in particular one detection region, either the first detection region or the second detection region, can lie entirely within the other detection region, which is either the second detection region or the first detection region. It is also possible for the detection regions to be fully congruent, exactly overlapping each other. The concepts "overlap" and "congruent" in this case are used in particular with reference to the azimuth.

In particular a vertical axis is understood here to mean an axis that runs in the direction of a gravitation vector and/or perpendicularly to a contact plane or roadway surface on which a vehicle equipped to execute the method is standing or traveling.

For the laser scanner, a LiDAR (Light Detection And Ranging) detector is preferably used.

The optical camera is understood to be an optical image capturing device that is equipped to capture static or moving images, in particular two-dimensional static or moving images, wherein the optical camera can be configured in particular as a photo camera or video camera. However, it is also possible to use an optical 3D camera.

The laser scanner preferably scans the surroundings continuously at regular intervals. At the same time, the camera's optical sensor is preferably exposed at least twice in multiple laser scanner periods. It is especially preferred for the optical sensor to be exposed at least twice in every laser scanner period.

Preferably, the camera's optical sensor is exposed more than twice during one laser scanner period. Multiple exposures can be used advantageously to obtain additional or more precise information about the surroundings, in particular to reduce image capture dead times. There can be, in particular, more than one exposure outside of the first time window. Specifically, there can be more than one image capture with an exposure time that is longer than the first exposure time within the first time window.

According to another embodiment of the invention, the second exposure of the at least two exposures for the optical sensor outside of the first time window occurs in a second time window, wherein the laser scanner preferably does not scan the first detection region in the second time window. In general, any time window within the laser scanner's period can be chosen for the second exposure, because in that respect no synchronization with the laser scanner's detection is necessary. However, positioning the second exposure outside of the first time window allows for much cleaner separation between the data that are determined for the synchronization with the laser scanner's detection and those that are not.

According to another embodiment of the invention, the first exposure time occurs in a middle range of the first time window, in particular symmetrically with respect to a half of the first time window. Because the laser scanner, according to one preferred embodiment, scans the first detection region with constant scanning speed, and in particular with constant angular velocity, with this choice the first exposure occurs precisely when the laser scanner passes the middle of the first detection region. This yields especially good correspondence between the captured optical image and the scanned 3D points of the laser scanner. This is in particular true if the second detection region of the optical camera is also aligned centrally with the first detection region.

According to another embodiment of the invention, the selected second exposure time for the second exposure is longer than the first exposure time for the first exposure. In this case, the second exposure time for the second exposure is chosen in particular to be long enough that illuminated signs operated by pulse-width modulation, such as traffic lights, illuminated traffic signs, brake lights, turn signals, etc., can be recognized reliably, so that in particular even for the shortest known pulse-width-modulated traffic sign, at least one light phase is detected within the second exposure time.

The first exposure time is preferably chosen to be short enough that, even on a moving vehicle, sharp enough images are detected for meaningful semantic segmentation and their assignment to the 3D point cloud detected by the laser scanner.

According to another embodiment of the invention, the first exposure time and/or second exposure time is/are adapted to the laser scanner period. This guarantees precise synchronization of the optical detection with the laser scanner, and it also guarantees that in particular the second exposure time does not exceed the laser scanner period.

The first exposure time is preferably 10 ms at most, more preferably 8 ms at most, more preferably 7 ms at most, more preferably 6 ms at most, more preferably 5 ms at most, more preferably 4 ms at most, more preferably 4 ms.

The second exposure time is preferably 45 ms at most, more preferably 40 ms at most, more preferably 30 ms at most, more preferably 20 ms at most, more preferably 15 ms at most, more preferably 12 ms, more preferably more than 10 ms, more preferably from at least 11 ms to 45 ms at most, more preferably from at least 11 ms to 40 ms at most, more preferably from at least 11 ms to 30 ms at most, more preferably from at least 11 ms to 20 ms at most, more preferably from at least 11 ms to 15 ms at most.

In one preferred embodiment, the laser scanner period is 90 ms long, wherein the laser scanner scans a scan range of 360° in those 90 ms. The first detection region is preferably an angle range of 120°, which is therefore scanned within 30 ms at a constant angular velocity of the laser scanner. The laser scanner requires the remaining 60 ms of the period to complete the entire rotation. The first detection range lies, without any loss of generality, in an angle range of 0 to 120°. If the first exposure time is 4 ms, the first exposure of the optical camera preferably occurs when the laser scanner is at approximately 60°, so halfway through the first detection region. For example and without any loss of generality, if the laser scanner starts scanning at 0° at a point in time t=0, the camera exposure preferably begins at the point in time t=13 ms and lasts 4 ms. During that time—at t=15 ms—the laser scanner passes the middle of the first detection region. After 30 ms, the complete first detection region is scanned.

When the second exposure of the optical sensor occurs is in principle irrelevant. For example, if the second exposure begins at t=58 ms, a constant camera cycle time of 45 ms can be extrapolated. In order to detect currently known pulse-width-modulated light signals, a duration of 12 ms for the second exposure time is advantageous. A new measurement cycle begins every 90 ms.

The optical camera's exposure and exposure time and the laser scanner's scanning are therefore coordinated as follows: During a laser scanner scan, the optical camera is briefly exposed at the exact moment when the laser scanner region currently being scanned corresponds with the camera's line of sight. Because of the rotating units, the laser scanner's period is generally longer than the exposure time and dead time between two exposures of the optical camera, so the camera can be exposed an additional time with a longer exposure time, when the laser scanner is not precisely detecting the surroundings or scanning regions outside of the camera's second detection region. This results in one shorter-exposed image, synchronized with the laser scanner, and one longer-exposed image for illuminated sign recognition.

There is no restriction requiring that the laser scanner cannot scan surroundings outside of the first detection region. The laser can also scan surroundings within the same scanning region multiple times. In this case, then, the first detection region is the laser scanner's scanned range that overlaps the optical camera's second detection region.

According to another embodiment of the invention, at least one image taken during the optical sensor's first exposure time is semantically segmented, wherein the semantic segmentation is applied to the laser scanner's data. In particular, the semantic segmentation of an image taken during the first exposure time is applied to the laser scanner data that was detected during the same laser scanner period, in which the image taken during the first exposure time was also taken. This allows for precise assignment of the optical image's semantic segmentation to the laser scanner data.

Semantic segmentation preferably occurs by means of a neural network, in particular a so-called (Convolutional Neural Network), specifically using Deep Learning.

Finally, the invention's objective is also achieved by offering an apparatus for detecting surroundings, in particular the surroundings around a vehicle, which comprises a laser scanner configured to periodically scan a first detection region of the surroundings, wherein the apparatus also comprises an optical camera configured to scan the surroundings in a second detection region, wherein the first detection region and the second detection region at least overlap. The apparatus further has a control unit operatively connected to both the optical camera and the laser scanner in order to control the optical camera and the laser scanner, wherein the control unit is configured to execute a method according to the invention or a method according to one of the previously described embodiments of the invention. The advantages already described with respect to the method also apply specifically to the apparatus.

The optical camera and the laser scanner are preferably aligned parallel to each other with respect to their main axes. In this case, the main axes are those axes that extend in the direction of the detection regions. In particular, the laser scanner's main axis is an axis that extends symmetrically into the first detection region. The optical camera's main axis is specifically the optical axis of the camera's lens. If the main axes of the optical camera and the laser scanner are oriented parallel to each other, they have the same line-of-sight direction.

The objective is also achieved by offering a vehicle that has an apparatus according to the invention or an apparatus according to one of the previously described embodiments of the invention. The advantages already described with respect to the method also apply specifically to the vehicle.

According to another embodiment of the invention, the vehicle is a motor vehicle, in particular a personal automobile, cargo vehicle, or utility vehicle.

BRIEF DESCRIPTION OF THE DRAWINGS

The invention is explained in more detail below, based on the figures.

The figures show.

DETAILED DESCRIPTION

Figure 1:
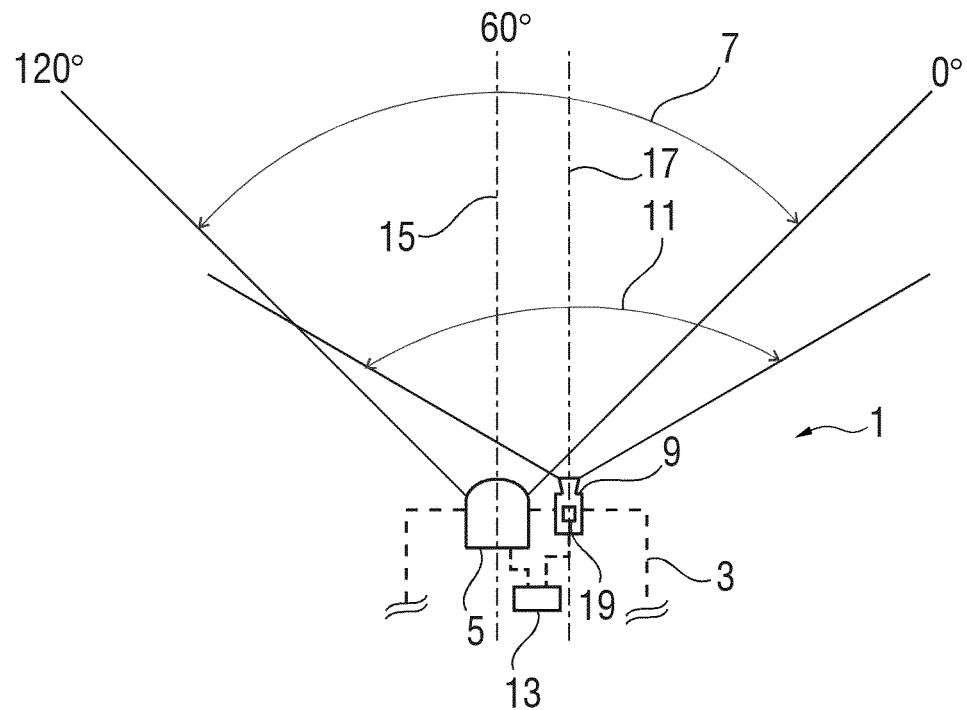
FIG. 1 a schematic representation of one example of an apparatus for scanning surroundings, and FIG. 2 a schematic representation of one embodiment of a method for scanning surroundings.

FIG. 1 shows a schematic representation of one example of an apparatus 1 for scanning surroundings, in particular the surroundings around a schematically represented vehicle 3, which can preferably be a motor vehicle, in particular a personal automobile, cargo vehicle, or utility vehicle.

The apparatus 1 comprises a laser scanner 5 configured to periodically scan the surroundings—here the surroundings around the vehicle 3—in a first detection region 7. The apparatus 1 further comprises an optical camera 9 configured to detect the surroundings in a second detection region 11. Here the first detection region 7 and the second detection region 11 at least partially overlap each other. The apparatus 1 further has a control unit 13 operatively connected to both the laser scanner 5 and the optical camera 9 so that the control unit 13 can control the laser scanner 5 and the optical camera 9.

Here the control unit 13 is configured to execute the above-described method as explained below.

The optical camera 9 and the laser scanner 5 are aligned parallel to each other with respect to their main axes. Here a first main axis 15 of the laser scanner 5 and a second main axis 17 of the camera 9 are shown in FIG. 1, which are oriented parallel to each other so that both the laser scanner 5 and the optical camera 9 have the same line-of-sight direction.

The detection regions 7, 11 are both angle ranges of an azimuth angle.

The laser scanner 5 in particular has a scanning range that is larger than the first detection region 7. Specifically, the laser scanner's scanning range comprises a full azimuth angle range of 360°. The laser scanner periodically scans the entire scanning range, wherein it scans the first detection region 7 of the surroundings within such a period.

Here the first detection range is, for example, an angle range of 120°, extending from 0° to 120° as in FIG. 1 without any loss of generality. Here the first main axis 15 bisects the first detection region 7, i.e., at 60°. The laser scanner 5 scans the scanning range preferably at a constant angular velocity.

As part of the method for detecting surroundings, an optical sensor 19 in the camera 9 is exposed at least twice within one period of the laser scanner 5. Here a first exposure time for a first exposure of the at least two exposures of the optical sensor 19 is chosen and synchronized with the laser scanner 5 so that the first exposure occurs within a first time window, in which the laser scanner 5 scans and therefore detects the first detection region 7.

The second exposure of the at least two exposures for the optical sensor 19 can occur outside of the first time window in a second time window, in which the laser scanner 5 preferably does not scan the first detection region 7.

The first exposure preferably occurs in a middle range of the first time window, in particular symmetrically to a half of the first time window. This guarantees that the first exposure occurs when the laser scanner 5 is scanning precisely in the middle range of the first detection region 7, preferably—and specifically symmetrically—around the 60° mark in FIG. 1, i.e., in particular symmetrically to the first main axis 15.

The selected second exposure time for the second exposure is preferably longer than the first exposure time for the first exposure. In particular, specific selection of the exposure times can guarantee that the first exposure time is short enough to allow images that are sharp enough for semantic segmentation and for the application of that semantic segmentation to the 3D data collected by the laser scanner 5, and that the second exposure time is also long enough to reliably detect pulse-width-modulated light signals.

Here the first exposure time and/or second exposure time is/are adapted to the period of the laser scanner 5.

At least one image taken by the optical sensor 19 or optical camera 9 during the first exposure time is semantically segmented, wherein this semantic segmentation is applied to data from the laser scanner 5, in particular to data acquired during the same period of the laser scanner 5 as the image taken during the first exposure time.

Figure 2:
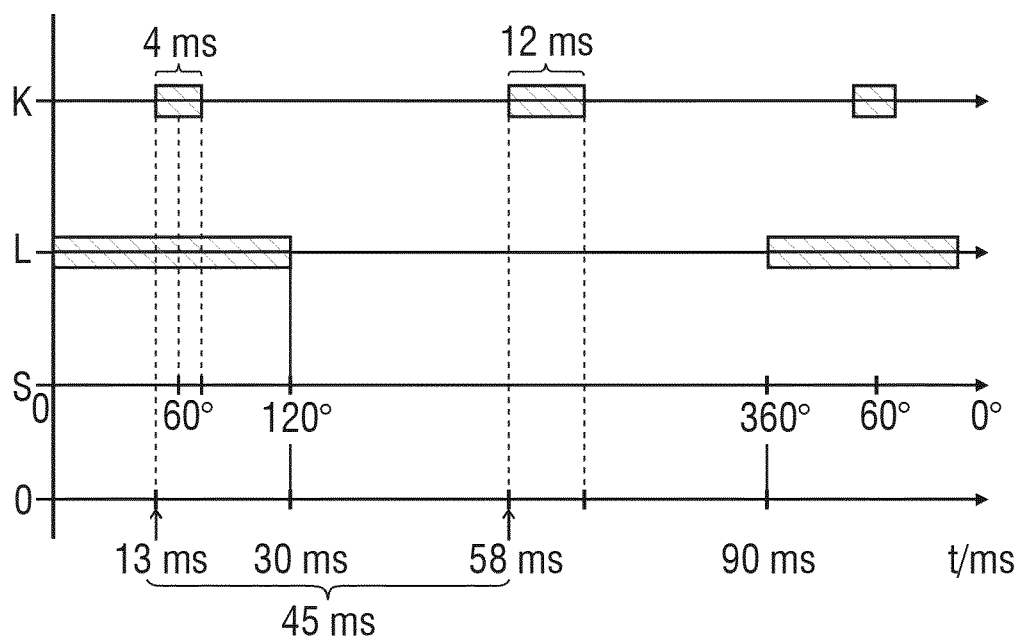

FIG. 2 shows a schematic representation of one embodiment of the invention. Here the time t in ms is marked along the lowest axis. An exposure K of the camera 9 is represented on an uppermost axis; scanning the surroundings with the laser scanner 5 in the first detection region 7 is represented on the second axis from the top as laser scan L; the scanning angle S of the laser scanner 5 over the same scanning range of 0 to 360° is marked on the third axis from the top.

Purely as an example and with no loss of generality, the period of the laser scanner 5 here is 90 ms, within which the complete scanning range of 0 to 360° is scanned. Here the first detection region 7 of 120° is scanned within 30 ms. In this case, with no loss of generality, the first detection region 7 begins at 0° and ends at 120°.

Here the first exposure time for the optical sensor 19 is 4 ms. It is positioned so that it is placed in time in a middle range of the first time window, i.e., here from t=0 to t=30 ms, wherein the first exposure time begins at t=13 ms and correspondingly ends at t=17 ms. Therefore, the middle of the first exposure time coincides precisely with the point in time when the laser scanner 5 reaches the 60° point of the first detection region 7, i.e., t=15 ms.

The second exposure time is 12 ms. It is set outside of the first time window in the period of the laser scanner 5, so that here it begins at t=58 ms, i.e., with a distance in time of 45 ms to the beginning of the first exposure time.

After 90 ms, or 360° of the scanning angle S, the method continues with additional periods.

Overall, with the method, the apparatus 1, and the vehicle 3 presented above, meaningful semantic segmentation of both camera images and 3D data from the laser scanner 5 can occur, and pulse-width-modulated light signals can also reliably be detected.

The invention claimed is:

1. A method for detecting surroundings around a vehicle, comprising:
    periodically scanning the surroundings in a first detection region by a laser scanner;
    detecting the surroundings in a second detection region by an optical camera;
    wherein the first detection region and the second detection region at least overlap each other;
    wherein an optical sensor in the camera is exposed at least twice within one period of the laser scanner,
    wherein a first exposure time for a first exposure of the at least two exposures of the optical sensor is chosen and synchronized with the laser scanner so that the first exposure occurs within a first time window, in which the laser scanner scans the first detection region; and
    wherein a second exposure of the at least two exposures for the optical sensor occurs outside of the first time window in a second time window, in which the laser scanner does not scan the first detection region.

2. The method of claim 1, wherein the first exposure occurs in a middle range of the first time window, including symmetrically with respect to a half of the first time window.

3. The method of claim 1, wherein a selected second exposure time for the second exposure is greater than the first exposure time for the first exposure.

4. The method of claim 1, wherein the first exposure time and/or second exposure time is/are adapted to the period of the laser scanner.

5. The method of claim 1, wherein at least one image taken during the first exposure time of the optical sensor is semantically segmented, wherein the semantic segmentation thus obtained is applied to the data from the laser scanner.

6. An apparatus for detecting surroundings around a vehicle, comprising
    a laser scanner configured to periodically scan the surroundings in a first detection region,
    an optical camera configured to detect the surroundings in a second detection region, wherein
    the first detection region and the second detection region at least overlap each other, and with
    a control unit operatively connected to both the laser scanner and the optical camera in order to control the laser scanner and the optical camera, such that
    an optical sensor in the camera is exposed at least twice within one period of the laser scanner,
    a first exposure time for a first exposure of the at least two exposures of the optical sensor is chosen and synchronized with the laser scanner so that the first exposure occurs within a first time window, in which the laser scanner scans the first detection region, and
    wherein a second exposure of the at least two exposures for the optical sensor occurs outside of the first time window in a second time window, in which the laser scanner does not scan the first detection region.

7. The apparatus of claim 6, wherein the optical camera and the laser scanner are aligned parallel to each other with respect to their main axes.

8. The apparatus of claim 6, wherein the vehicle is a personal automobile, cargo vehicle, or utility vehicle.

9. The apparatus of claim 6, wherein said laser scanner has a scanning range that is larger than the first detection region.

10. The apparatus of claim 9, wherein said laser scanner has a scanning range comprising a full azimuth angle range of 360°.

11. The apparatus of claim 7, wherein a first main axis of the laser scanner bisects the first detection region.

12. The apparatus of claim 6, wherein the laser scanner is a light detection and ranging detector.

13. The apparatus of claim 6, wherein the first detection region is an angle range of 0 degrees to 120 degrees.

* * * * *